US007138437B2

(12) United States Patent
Giorgini et al.

(10) Patent No.: US 7,138,437 B2
(45) Date of Patent: Nov. 21, 2006

(54) POLYURETHANE COMPOSITION CONTAINING A PROPERTY-ENHANCING AGENT

(75) Inventors: Albert A. Giorgini, Lino Lakes, MN (US); Charles J. Torborg, Blaine, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 89 days.

(21) Appl. No.: 10/379,625

(22) Filed: Mar. 4, 2003

(65) Prior Publication Data

US 2004/0176490 A1  Sep. 9, 2004

(51) Int. Cl.
*C08K 5/01* (2006.01)
*C08J 9/04* (2006.01)

(52) U.S. Cl. ............... 521/101; 104/307; 521/137; 521/155; 521/170; 524/59; 524/64; 524/66; 525/123; 525/129; 525/453; 525/455; 525/457; 525/458

(58) Field of Classification Search ........ 521/101, 521/137, 155, 170; 524/59, 64, 66; 525/123, 525/129, 453, 455, 457, 458; 104/307
See application file for complete search history.

(56) References Cited

U.S. PATENT DOCUMENTS

| | | | |
|---|---|---|---|
| 2,886,774 A | 5/1959 | Probus | |
| 3,054,755 A | 9/1962 | Windemuth et al. | |
| 3,073,802 A | 1/1963 | Windemuth et al. | |
| 3,350,332 A * | 10/1967 | Hardy et al. | 525/127 |
| 3,968,657 A * | 7/1976 | Hannay | 405/232 |
| 3,984,493 A * | 10/1976 | Kazama et al. | 525/129 |
| 4,080,357 A * | 3/1978 | Gergen et al. | 524/505 |
| 4,134,546 A * | 1/1979 | Dankert | 238/370 |
| 4,156,440 A * | 5/1979 | Katoh et al. | 238/2 |
| 4,295,259 A | 10/1981 | Rhodes et al. | |
| 4,394,462 A * | 7/1983 | Pusineri et al. | 521/137 |
| 4,408,026 A * | 10/1983 | Pusineri et al. | 525/128 |
| 4,567,236 A * | 1/1986 | Goldwasser et al. | 525/127 |
| 4,584,233 A * | 4/1986 | Meader | 442/151 |
| 4,661,532 A | 4/1987 | Morin | |
| 5,360,871 A * | 11/1994 | Iwanaga et al. | 525/131 |
| 5,556,934 A | 9/1996 | Hagquist et al. | |
| 5,929,153 A * | 7/1999 | Mori et al. | 524/399 |
| 5,952,053 A | 9/1999 | Colby | |
| 5,952,072 A | 9/1999 | Colby et al. | |
| 6,288,133 B1 | 9/2001 | Hagquist | |
| 6,455,605 B1 | 9/2002 | Giorgini et al. | |

OTHER PUBLICATIONS

Sax et al.; Hawley's Condensed Chemical Dictionary, Eleventh Edition; Van Nostrand Reinhold; New York; 1987; p. 290.*

* cited by examiner

*Primary Examiner*—Rabon Sergent

(57) ABSTRACT

A composition comprising at least a part A and a part B is disclosed. The part A comprises at least one polyol and the part B comprises at least one isocyanate. At least one part further comprises at least one of the following: a strength enhancer having a softening point of from about 120° F. to about 400° F.; a non-reactive hydrophobic enhancer; and/or an impact absorption enhancer. These enhancers provide, among optional other benefits, enhanced pull strength. Additionally, a mass can be prepared by a method of combining part A with part B and applying the mixture to a void. The compositions may also be used in the repair of surface defects or for the reinforcement of structural members such as spike holes left after spike removal from railroad ties during road bed maintenance or repair.

12 Claims, No Drawings

POLYURETHANE COMPOSITION CONTAINING A PROPERTY-ENHANCING AGENT

FIELD OF THE INVENTION

This invention relates to a composition comprising at least a part A and a part B. The part A comprises at least one polyol and the part B comprises at least one isocyanate. At least one part further comprises at least one of the following: a strength enhancer having a softening point of from about 120° F. to about 400° F.; a non-reactive hydrophobic enhancer; and/or an impact absorption enhancer. These enhancers provide, among optional other benefits, enhanced pull strength. Additionally, a mass can be prepared by a method of combining part A with part B and applying the mixture to a void. The composition may also be used in the repair of surface defects or for the reinforcement of structural members such as spike holes left after spike removal from railroad ties during roadbed maintenance or repair.

BACKGROUND OF THE INVENTION

Materials used to repair defects in structural members should have certain characteristics. The material should be easily applied and should form high strength bonds to structural members made of varying materials. Particularly for outdoor repairs, the repair materials should be usable in many environments including environments having extremes of heat and cold and having the presence of substantial quantities of environmental water.

One particularly important end use for such repair compositions is in the recycle or reuse of railroad ties. Typically in the maintenance of the railroad right of way, the rails along with the tie plates and spikes are removed from railroad ties, which remain in the roadbed. If a new rail is to be spiked to the old tie, it is critical that the railroad tie spike holes be repaired prior to laying the new rail. The presence of spike holes in an old tie can cause problems since if a spike is driven into a portion of the tie near an old spike hole, the driving force of the spike can displace the spike from its intended location into an old hole, displacing the rail, tie plate and spike. In the instance that the spike is driven into an incorrect location substantial economic loss can result in repairing the misaligned rail. If a misaligned rail is not repaired, the defect can cause derailment or other problems. Further, the spike holes can be the source of structural weakness in the tie, allowing water to enter the core of the tie accelerating the degradation.

The use of polyurethane foam in filling spike holes in used railroad ties has come a long way, but still can present significant problems. The polyurethane foam compositions do not appear to consistently adhere to a spike hole with sufficient adhesion to prevent the accidental removal of the foam repair mass during the repair and subsequent mechanical rail installation. Further, most urethane foams of the prior art tended to foam uncontrollably in the presence of substantial environment moisture. Since moisture tends to accelerate the foaming properties of the urethane composition, the presence of water can cause too rapid of cell expansion resulting in a foam mass of low strength and low density that can result in the formation of an incomplete or unreliable repair of structural members.

Various polyurethane compositions and improvements have been suggested. However, there is still a substantial need in the art for repairing compositions that employ non-carcinogenic ingredients and that can be used to repair surface defects on structural components such as railroad ties to provide a repair mass having strong adhesion to the substrate structural member and strong pulling strength, which can be used in the presence of substantial quantities of environmental water and can be used in automatic application equipment in all temperatures.

SUMMARY OF THE INVENTION

The compositions of the present invention comprise at least a part A and a part B. The part A comprises at least one polyol and the part B comprises at least one isocyanate. At least one part further comprises at least one of the following: astrength enhancer having a softening point of from about 120° F. to about 400° F., a non-reactive hydrophobic enhancer, and/or an impact absorption enhancer. These enhancers provide, among optional other benefits, enhanced pull strength. Methods of using these compositions are also disclosed.

DETAILED DESCRIPTION OF THE INVENTION

I. The Compositions:

The composition of the present invention comprises at least two parts—part A and part B. Generally, each part is provided separately and mixed immediately prior to application. However, the invention also contemplates encapsulated ingredients which release, e.g., upon exposure to pressure and/or heat, particularly encapsulated catalysts, isocyanates and/or gelling agents. Thus, part B could be encapsulated discrete particles dispersed in a liquid part A (e.g. at 80F) or vise verse. Solid particles dispersed in a liquid medium however are considered the same "part". In some embodiments, the polyurethane composition is formulated as a foamable composition. That is, the composition foams, upon mixing the two parts and exposing the mixture to the environmental pressures and temperatures. The density of the compositions does not typically change substantially when the composition is cured in the wet environments in comparison to the dry environments. In some embodiments, the difference in the wet density from the dry density is no greater than about 20 lbs./ft$^3$ (0.32 kg/dm$^3$) more preferably no greater than about 10 lbs./ft$^3$ (0.16kg/dm$^3$)

A. Part A.: Part A of the composition comprises at least one polyol.

Polyols and methods for their preparation are known. For the purpose of the present invention, a "polyol" is an ingredient having at least two active hydrogen atoms. The term "active hydrogen atom" refers to hydrogen which displays activity according to the Zerewitnoff test as described by Kohlerin, Journal of American Chemical Society, Vol. 49, pp 31–81 (1927). For the purpose of the present invention, a "polyol" does not include water, although water may be included in the composition. Polyols are typically present in part A at from about 5% to about 100% by weight of the part. As used herein, the phrase "by weight of the part" means that the weight percentage is based upon the weight of the part that contains the ingredient (or in this case the polyol). In other words, if part A comprises the ingredient, the weight percentage of "from about 5% to about 50% by weight of the part" means from about 5% to about 50% by weight of Part A.

The polyol(s) in part A, in general, have a number average molecular weight of from about 50 to about 8000, a functionality of from about 2 to about 8, and a hydroxyl number of from about 14 to about 1800, or from about 24 to about 500, as determined by ASTM designation E-222-67 (Method B).

Useful polyols include polyethers, polyesteramides, polythioethers, polycarbonates, polyacetals, polyolefins, polysiloxanes, various grades of caster oils, hydroxy-terminated prepolymers. Polyether polyols are used more often. Suitable polyether polyols (or polyoxyalkylene polyols) are prepared by reaction of any of the following polyhydroxy compounds with an alkylene oxide such as ethylene oxide, 1,2-propylene oxide, 1,3-propylene oxide, epichlorohydrin, epibromohydrin, 1,2-butene oxide and tetrahydrofuran. Suitable polyhydroxy compounds for reaction with the alkylene oxides include simple aliphatic polyols such as ethylene glycol, 1,2-propylene glycol, 1,3-butylene glycol, 2,3-butylene glycol, tetramethylene glycol, pentamethylene glycol, hexamethylene glycol, decamethylene glycol, 2,2-dimethyltrimethylene glycol, glycerin. Trimethylolethane, trimethylolpropane, pentaerythritol, sorbitol, 1,6-hexanediol, 1,2,6-hexanetriol, 2-ethyl-1,3-hexanediol, castor oil, polyvinyl alcohol and partially hydrolyzed polyvinyl acetate; carbohydrates containing 5 to 8 hydroxyl groups such as sucrose, dextrose, and methylglucoside, ether polyols such as diethylene glycol and dipropylene glycol; aromatic polyols such as diphenylene glycol; and mixtures thereof are also useful. These polyether polyols include polyethylene glycol and polytetramethylene ether glycol.

Other suitable polyols include, such as, ethylene glycol, propylene glycol, diethylene glycol, dipropylene glycol, 1,4-butanediol, 1,6-hexanediol, hydroxy terminated prepolymers, glycerol, trimethylolpropane, 1,2,4-butanetriol, 1,2,6-hexanetriol and mixtures thereof. Polyols described in U.S. Pat. No. 4,661,532, U.S. Pat. No. 6,288,133 B1 and U.S. Pat. No. 6,455,605 may also be employed.

Part A of the composition may further comprise at least one gelling agent. Any material that will thicken the mixture, particularly at the interface that contacts the substrate or water, to the extent that the isocyanate component is substantially prevented from reacting with excess environmental water, is suitable for use as the gelling agent. Suitable gelling agents include peroxides, polyamides, and preferably polyamines. The polyamine is typically a primary or secondary amine and present in the part A component in a range from about 0.1% to about 10% by weight of the part, and preferably from about 0.5% by weight to about 5% by weight of the part. Upon mixing the polyol and isocyanate component, the composition typically gels within 1 minute or even within about 5 seconds or less when mixed and applied by meter-mix application equipment.

In the embodiments where a polyurethane foam is formed, part A may also comprises at least one blowing agent. A common blowing agent is water, which may be present in an amount of from about 0.05% by weight to about 1% by weight of the part or even 0.15% to 0.5% by weight of the part. In many instances, the polyol(s) and/or the other ingredients in part A may contain a small concentration of residual moisture or water that may be sufficient to act as a blowing agent. Accordingly, the blowing agent may be inherently present, and thus need not be separately added.

B. Part B: Part B of the composition of the present invention comprises at least one isocyanate.

Any of a wide variety of organic polyisocyanates compositions may be employed in the isocyanate component, including monomeric and/or polymeric polyisocyanates which may be linear, branched, cyclic aliphatic polyisocyanates, cycloaliphatic polyisocyanates, aromatic polyisocyanates, isocyanate-terminated prepolymers, isocyanurates and mixtures thereof. Representative examples include 2,4-toluene diisocyanate (TDI), diphenyl methane diisocyanate (MDI), m-phenylene diisocyanate, 4-chlor-1,3-phenylene diisocyanate, 4,4'-biphenyl diisocyanate, 1,5-naphthalene diisocyanate, 1,4-tetramethylene diisocyanate, 6-hexamethylene diisocyanate, 1,10-decamethylene diisocyanate, 1,10 decamethylene diisocyanate, 1,4-cyclohexylene diisocyanate, 4,4'-methylene-bis(cyclohexyl isocyanate) and others. Further, the isocyanate compound may contain other substituents that do not substantially detract from the reactive natures of the isocyanate groups. In some embodiments, a blend of two or more isocyanates wherein at least one of the isocyanates is aromatic may be employed. Aromatic diisocyanates, those that have at least two isocyanate groups directly attached to an aromatic ring, react in the urethane reaction more rapidly with polyols than the aliphatic isocyanates. Some other particularly useful isocyanates are polymeric MDIs s including polymethylene polyphenyl isocyanates containing 4,4'methylene bisphenyl isocyanate commercially available from The Dow Chemical Company, Midland, Mich. as PAPI 27, PAPI 20 and PAPI 94; from Huntsman as Rubinate M, Rubinate 9257, and Rubinate 9258; and from Bayer as Modur MR, MR-200 and MRS-10. Isocyanates described in U.S. Pat. No. 4,661,532, U.S. Pat. No. 6,288,133 B1, and U.S. Pat. No. 6,455,605 may also be employed.

Isocyanate-terminated prepolymers can also be used. Isocyanate-terminated prepolymers are known from U.S. Pat. Nos. 3,073,802 and 3,054,755 and are generally prepared by reacting an excess of polyisocyanates, such as an aromatic diisocyanate with polyalkylene ether glycols, or polyester glycols. The isocyanate can also be used in the form of a blocked isocyanate.

The isocyanate is present in part B in an amount of up to about 100% by weight of the part. In some embodiments, the isocyanate is employed at a concentration from about 50% to about 95% by weight of the part, and in other embodiments, from about 70% to about 90% by weight of the part.

C. Optional Ingredients: Part A and/or part B of the composition may further comprises at least one diluent to reduce the viscosity of the composition, thereby enhancing the flow characteristics, especially during the railroad tie repair operation. Suitable diluents include polymeric resins, elastomers, waxes, oils and mixtures thereof. Specific examples include phthalate esters, alkyl phosphates, polyphenyls, di- and triphenyl compounds as well as partially hydrogenated versions, aromatic oils, chlorinated waxes or paraffins, adipate esters, synthetic rubber polymer, natural oils, rosin and rosin derivatives, and polysulfide rubber. One of ordinary skill in the art will readily recognize that, e.g., synthetic rubber polymers that are useful as diluents are not the same as those synthetic rubber polymers useful as enhancers in the present invention. A key difference readily apparent is the viscosity of the synthetic rubber polymers as their viscosity directly impacts the viscosity of the part. One diluent is Eastman TXIB Plasticizer, which is 2,2,4-trimethyl-1,3-pentanediol diisobutyrate from Eastman Chemical Company (Kingsport, Tenn.). The diluent may be present in either part in a range of from about 1% to about 50% by weight of the part, and may be from about 5% to about 20% by weight of the part.

Advantageously, the ingredients may be selected to lower the crystallization temperature of each of part A and/or part B components to improve the freeze-thaw stability. For example, the railroad industry repairs tracks year round, and fluctuations in temperature, especially during low temperatures, prefer that each part flow without additional heat at reduced temperatures. Additionally, the isocyanate used in the part B component may tend to crystallize under cooler temperatures so the addition of a diluent allows enhanced processing characteristics.

Part A and/or part B of the composition may further comprise at least one catalyst. The reaction rate of part A with part B can be accelerated by incorporating an effective amount of at least one catalyst that promotes the active hydrogen atom/isocyanate reaction. Suitable catalysts are those known to enhance the polyol/isocyanate reaction, water/isocyanate reaction, urethane/isocyanate reaction and urea/isocyanate reaction. In some embodiments, a combination of the catalysts is employed to accelerate the formation of the urethane linkages as well as the isocyanurate linkages. Applicants surmise that the final cured product is comprised of a variety of linkages including isocyanurate, biuret and urea linkages rather than predominantly urethane linkages when using a combination of the catalysts. If present, the amount of catalyst(s) may be from about 0.1% by weight to about 5% by weight of the part, or from about 0.3% by weight to about 3% by weight of the part. Further, catalysts may be employed in combination with various accelerators and/or curing agents such as Lewis Base catalysts including, e.g., ANCAMINE K.54 (Pacific Anchor Chemical Corporation, Los Angeles, Calif.), a tris-(dimethylaminomethyl) phenol. Other useful catalysts include organic amine compounds and organo metallic compounds and mixtures thereof. The amine based catalysts differ from the polyamine gelling agent with respect to the number of reactive sites present in the molecule as well as to the concentration employed. Whereas amine based catalysts are typically tertiary amines, the polyamine gelling agent is typically a primary or secondary amine.

Specific examples of useful catalysts to promote the urethane reaction include dibutyltindilaurate, stannous octoate, tertiary aliphatic and tertiary alicyclic amines including triethylamine, triethanolamine, tri-n-butylamine, triethylenediamine, alkylmorpholene, etc. Complex mixtures of such catalysts and modified forms may also be employed.

For the promotion of the isocyanurate reaction, specific types of catalysts are used such as Polycat 41 (N,N,N',N',N'',N''-hexamethyl-1,3,5-triazine 1,3,5 (2H, 4H, 6H tripropanamine), Polycat 43 (a proprietary tertiary amine) and various catalysts based on potassium salts of organic acids including DABCO T-45 (potassium octanate in dipropylene glycol (DPB) (60/40), DABCO K-15 (potassium octanate in DPG (70/30), METACURE T-120 (organo tin catalyst (17.5% tin) exhibiting high catalytic activity), and Polycat 46 (potassium acetate in ethylene glycol). The Polycat and DABCO catalysts are available from Air Products & Chemicals, Inc. (Allentown, Pa.). Most preferred are combinations of isocyanurate reaction catalysts. For example, a slower reacting trimer catalyst such as DABCO TMR-2 and DABCO TMR-3 (quaternary ammonium salts) and DABCO TMR-30 (2,4,6-tris(dimethylaminomethyl)phenol) may be employed and preferably in combination with a stronger trimer catalyst. Alternatively, combinations of suitable strong trimer catalysts and a small amount of urethane catalyst, such as DABCO 33 LV (triethylene diamine in DPG (33/67) and a metal based catalyst like DABCO T-12 (dibutyltin dilaurate) may also be employed. These catalyst systems are preferred to minimize initial foaming as described in U.S. Pat. No. 5,556,934 issued Sep. 17, 1996.

II. Property Enhancing Agents:

The compositions of the present invention also comprise at least one property-enhancing agent in at least one of the parts. As used herein, the phrase "in at least one of the parts" means that the property enhancing agent may be found in part A, in part B, or in both parts. The phrase "property-enhancing agent" refers to strength enhancers, non-reactive hydrophobic enhancers, and/or impact absorption enhancers. As used herein, the term "enhancer", when used without a preceding adjective, refers to strength enhancers, non-reactive hydrophobic strength enhancers, and/or impact absorption enhancers. As will be discussed in greater detail below, these enhancers have been found to impart beneficial properties such as increased pull strength and sometimes hydrophobicity and/or increased impact absorption.

A. Strength Enhancers: The compositions of the present invention may comprise a strength enhancer in at least one of the parts. It has been found that particularly useful strength enhancers have a softening point of from about 120° F. (49° C.) to about 400° F. (204° C.) or even from about 140° F. (60° C.) to about 300° F. (149° C.). As used herein, the phrase "softening point" is defined as stated in ASTM D6493-99. Not wishing to be bound in theory, it is believed that when the compositions of the present invention are used for applications such as rail road tie repair, the heat generated from driving a spike into the hole plugged with the compositions of the present invention causes these strength enhancers to melt to a degree and re-fuse, resulting in better pull strength. The term "pull strength" as used herein refers, in general to the quality of the bond between the compositions of the present invention and the structure(s) with which they interface. Quantitatively, the pull strength can be measured by one of the pull strength tests, which are described in greater detail in the Test Methods section below. Particularly useful strength enhancers typically exhibit pull strengths from at least about 1000 or at least about 1200 or even 1400 pounds according to the Pull Strength Test Method A. Strength enhancers useful in the present invention include but are not limited to asphalt, PVC resins, natural and synthetic rubbers and thermoplastic polyurethane resins. The term "asphalt" as used herein refers to solid or semi-solid natural or mechanical mixtures of bitumen obtained from native deposits or as petroleum byproducts. Specific examples include gilsonite, glance pitch and grahamite. "Asphalt" does not encompass bitumen that is obtained by distillation from coal, which, in addition to other problems, often includes carcinogens. The strength enhancers useful in the present invention are solid or semi-solid at 80° F. in order to exhibit the desired pull strength characteristics. The strength enhancers are dispersed in at least one of the parts. Strength enhancers may be included at from about 5% to about 50% by weight of the part, or even from about 10% to about 30% by weight of the part.

One of ordinary skill in the art will readily recognize that the softening points of these ingredients may vary depending upon their source. For example two sources of gilsonite have different softening points. Zeco1 1LMP available from Ziegler Chemical and Mineral Corporation has a softening point range of 248° F. to 290° F. while Lexco multipurpose grade from Lexco has a softening point of 330° F. to 350° F. Thus, when formulating with pull strength as a key criteria, it is recommended that the softening points mentioned above are targeted. However, as will be seen below, these enhancers may be useful in the present invention even when their softening points do not meet these limitations when one considers an ancillary beneficial property the enhancer brings to the compositions. In those situations where the softening points are not met, other criteria will be met.

B. Non-reactive Hydrophobic Enhancers. The strength enhancers mentioned above in section A may or may not have some additional desirable hydrophobic characteristics. Similarly, the non-reactive hydrophobic enhancers useful in the present invention may or may not meet the softening point criteria set forth in section A. Nevertheless, they do contribute to improved pull strengths of the final compositions and, moreover, have added benefits of hydrophobicity which results in more resilient, better performing compositions. These hydrophobic characteristics are particularly useful when dealing in situations where there may be an abundance of water or moisture. For example, vacant spike holes often contain pooled water, which increases the foaming and decreases the density, which can be detrimental. Additionally, these non-reactive hydrophobic enhancers do not detrimentally react chemically with other components in the system and therefore result in more stable individual parts. Thus, "non-reactive" means that the enhancer does not substantially react chemically with other components in the part thereby detrimentally affecting the stability of the part. Thus, it has been found that the use of enhancers which are also non-reactive and hydrophobic ("non-reactive hydrophobic enhancers") results in compositions having increased hydrophobicity which are stable and less likely to emulsify, absorb, and/or entrap water which can result in reducing the materials' density, rigidity and adhesion characteristics. "Hydrophobic" refers to those enhancers having a concentration of water at ambient temperature of less than 1% after being conditioned for 14 days at 100° F. (38° C.) and 95% relative humidity in a cylindrical container about 4 cm in height having an inside diameter of about 3 cm. Examples of non-reactive hydrophobic enhancers include but are not limited to asphalt such as gilsonite and some hydrocarbon resins. When used, the non-reactive hydrophobic enhancers are included at from about 1% to about 50% by weight of the part, or even from about 5% to about 30% by weight of the part.

C. Impact Absorption Enhancers. The strength enhancers mentioned above in section A may or may not have some additional desirable impact absorption characteristics. Similarly, the impact absorption enhancers useful in the present invention may or may not meet the softening point criteria set forth in section A, yet they do contribute to improved pull strengths of the final compositions and, moreover, have additional benefits of impact absorption which may be useful in some applications. The ability of the composition to absorb some vibrations or occasional jolts may preserve existing bonds between the structure and the compositions which otherwise would weaken the overall system and "true" pull strengths in a real setting. The phrase "impact absorption enhancers" refer to enhancers that improve pull strengths and provide desirable impact absorption characteristics. It is important that the "impact absorption enhancers" do not reduce the viscosity of the part they are incorporated in nor the viscosity of the final composition as it has been found that reducing viscosity generally diminishes the desired characteristics. Thus, the "impact absorption enhancers" used herein often have viscosities themselves of more than about 100,000 centipoises (cps). Specific examples of useful impact absorption enhancers include but are not limited to PVC, ground rubber, and glass or polymeric microspheres that do not reduce the viscosities as mentioned above. When used, the impact absorption enhancers are included at from about 1% to about 30% by weight of the part, or even from about 5% to about 10% by weight of the part.

Other characteristics of the polyurethane composition of the present invention can be modified with commonly used additives including fillers, extenders, ultraviolet (UV) stabilizers, antioxidants, fungicides, bactericides, surfactants, dyes, and mixtures thereof.

III. Methods of Making and Using:

The polyurethane compositions of the present invention can be made in accordance with known manufacturing methods. The polyol component and isocyanate component can be individually prepared using commonly available blending and mixing techniques. The composition may be effectively mixed and applied by using an automated meter mix equipment that blends the two packages at an appropriate ratio. In such processes, the two parts are meter-mixed together at a ratio of active hydrogen atoms (from Part A) to isocyanate group (from Part B) in a range of from about 1:0.8 to about 1:4, and preferably at a ratio of about 1:1 to about 1:2. Hence, excess isocyanate is usually preferred.

For repairing a railroad tie, the composition of the invention may be formulated to be foamable. During the application, the composition may be preheated to a temperature ranging from about 60° F. (27° C.) to about 120° F. (49° C.) and applied into the spike hole using an automatic mixing and application unit that is part of a track repair process, followed by replacement of the spike plate and rail and re-spiking the assembly together.

The composition of the present invention is also useful for reinforcement of composite structural members including building materials such as doors, windows, furniture and cabinets and for well and concrete repair. The composition can be used to fill any unintended gaps, particularly to increase the strength. Structural components are formed from a variety of materials such as wood, plastic, concrete and others, whereas the defect to be repaired or reinforced can appear as cuts, gaps, deep holes, cracks, etc.

IV. Test Methods

A. Density or Dry Density is determined by dispensing the composition directly into an empty cup of a known mass and volume at 77° F. (25° C.).

B. Wet Density is determined by the same method as the dry density except the compositions is dispensed directly into a 150 ml cup containing 20 ml water.

C. Pull Strength Test Method A:

A one (1) inch (25.4 mm) diameter hole is filled with the appropriate polyol/isocyanate mixture and allowed to cure for 30 minutes. A 3.5 inches (89 mm) hard cut masonry nail is then pounded into the cured dry plug to a depth of 2.0 inches (50.8 mm). After one (1) hour, the nail is removed from the plug using an Instron at a constant rate of 2.0 inch/min (50.8 mm/min). The maximum force exerted during the removal is reported as the "pull strength".

D. Pull Strength Test Method B:

A one (1) inch (25.4 mm) diameter hole is filled with the appropriate polyol/isocyanate mixture and allowed to cure for 30 minutes. A 4.5 inches (114 mm) 30D Common nail is then pounded into the cured dry plug to a depth of 2.4 inches (60 mm). After one (1) hour, the nail is removed from the plug using an Instron at a constant rate of 2.0 inch/min (50.8 mm/min). The maximum force exerted during the removal is reported as the "pull strength".

V. EXAMPLES

The following examples were prepared in accordance with the following general procedure:

Part A of the composition is prepared by adding the polyol(s) and filler(s), if any, to a Cowles dissolver at room temperature and agitating until the mixture is completely homogeneous. The moisture content of the material is then measure via Karl Fisher titration. Additional water is added, if necessary, to bring the overall moisture content up to the desired range. The remaining ingredients are then added and the mixture is agitated until the mixture is completely homogeneous. If a single isocyanate is employed as part B without any further ingredient no additional preparation is required. In the instances when part B also comprises other ingredient(s), e.g., PVC, diluent(s), polyols to make a prepolymer, etc. all the ingredients are added to a Cowles dissolver and agitated until the mixture is completely homogeneous.

Each part is packaged separately in an appropriate manner.

Table I represent various part A components whereas Table II represents several Part B components. The present invention encompasses all possible combinations of Part A components and Part B components in accordance with the claims. The dry/wet densities and the pull strength were tested upon combining the Part A component and Part B component at a 1 to 1 mix ratio by volume.

TABLE I

Part A Component

| Ingredient | Product Name | Chemical Description | A1 | A2 | A3 | A4 | A5 |
|---|---|---|---|---|---|---|---|
| Polyol | Desmophen 550U[1] | Polyether triol | 46.79 | — | 46.79 | 46.54 | — |
| Polyol | Poly-G 85-29[2] | Polyether triol | 24.0 | 14.0 | 14.0 | 14.0 | 14.0 |
| Polyol | Poly-G 30-400T[2] | Polyether triol | — | 46.79 | — | — | — |
| Polyol | Carpol GP-700[7] | Polyether polyol | — | — | — | — | 46.54 |
| Blowing Agent (target amount) | Water | Water | 0.1 | 0.1 | 0.1 | 0.06 | 0.04 |
| Catalyst | Dabco T-45[3] | Tertiary Amine in DPG | 0.5 | 0.5 | 0.5 | 0.5 | 0.5 |
| Catalyst | Dabco 120[3] | Tin Catalyst | 0.5 | 0.5 | 0.5 | 0.5 | 0.5 |
| Catalyst | Polycat 43[3] | Tertiary Amine | 0.7 | 0.7 | 0.7 | 0.7 | 0.7 |
| Asphalt | Gilsonite[4] | Natural asphalt | — | 10.0 | 10.0 | 10.0 | 10.0 |
| Filler | Vicron 25-11[5] | Calcium carbonate | 25.0 | 25.0 | 25.0 | 25.0 | 25.0 |
| Defoamer | Foamkill 8D[6] | Silicone | 0.01 | 0.01 | 0.01 | 0.01 | 0.01 |
| Surfactants | LK-443[3] | (proprietary) | 0.5 | 0.5 | 0.5 | 0.5 | 0.5 |
| Gelling Agent | Amicure PACM[3] | Cycloaliphatic Amine | 2.0 | 2.0 | 2.0 | 2.25 | 2.25 |
| Viscosity (cps at 77° F.) | | | 1550 | 2850 | 2600 | 3700 | 2200 |

[1] Available from Bayer Corp., Pittsburgh, PA;
[2] Available from Arch Chemical, Inc.;
[3] Available from Air Products and Chemicals, Inc, Allentown, PA;
[4] Available from Ziegler Chemical & Mineral Corp., Jericho, NY;
[5] Available from Specialty Mineral Inc., Lucerne Valley, CA;
[6] Available from Crucible Chemical Co., Greenville, SC;
[7] Available from Carpenter Co., Richmond, VA.

TABLE II

Part B Component

| Ingredient | Product Name | Chemical Description | B1 | B2 | B3 | B4 |
|---|---|---|---|---|---|---|
| Polyol | Carpol PGP-4000[1] | Polyether polyol | — | — | — | 11.18 |
| Polyol | Voranol 220-110[2] | Polyether diol | — | — | — | 4.22 |
| Isocyanate | PAPI 27[2] | Polymeric MDI | 50.0 | 50.0 | 50.0 | 55.0 |
| Isocyanate | PAPI 94[2] | Polymeric MDI | — | — | — | 9.6 |
| Isocyanate | PAPI 20[2] | Polymeric MDI | 5.0 | 5.0 | 5.0 | — |
| Diluent | EASTMAN TXIB[3] | 2,2-dimethyl-1-methylethyl)-1,3-propanediyl bis(2-methylpropanoate) | — | 20.0 | 15.0 | 15.0 |
| Impact absorption enhancer | Geon 198[4] | Polyvinyl chloride | — | — | 5.0 | 5.0 |
| Isocyanate | UR228MF[5] | MDI prepolymer | 25.0 | 25.0 | 25.0 | — |
| Diluent | Santisizer 261[7] | C7 to C9 alkyl benzyl phthalate | 20.0 | — | — | — |

TABLE II-continued

Part B Component

| Ingredient | Product Name | Chemical Description | B1 | B2 | B3 | B4 |
|---|---|---|---|---|---|---|
| Viscosity (cps at 77° F.) | | | 1900 | 1425 | 2200 | — |

[1]Available from Carpenter Co., Pasadena, TX;
[2]Available from The Dow Chemical Company, Midland, MI;
[3]Available from Eastman Chemical Co.;
[4]Available from PolyOne Corporation;
[5]Available from H.B. Fuller Company
[6]Available from Ferro Corporation, Bridgeport, NJ.

Example 1

Part A1 is reacted with Part B4 resulting in a foam having a wet density of 58 lbs, a dry density of 72 lbs./ft$^3$, and a pull strength of about 872 pounds measured according to Pull Strength Test Method A.

Example 2

Part A 2 is reacted with Part B4 resulting in a foam having a wet density of 70 lbs./ft$^3$, a dry density of 73 lbs./ft$^3$, and a pull strength of about 1470 pounds measured according to Pull Strength Test Method A.

Example 3

Part A3 is reacted with Part B4 resulting in a foam having a wet density at of 65 lbs./ft$^3$, a dry density of 73 lbs./ft$^3$, a pull strength of about 1,160 pounds measured according to Pull Strength Test Method A.

Example 4

Part A4 is reacted with Part B1 resulting in a foam having a wet density of 61 lbs./ft$^3$, a dry density of 72 lbs./ft$^3$, and a pull strength of about 384 pounds measured according to Pull Strength Test Method B.

Example 5

Part A4 is reacted with Part B2 resulting in a foam having a wet density of 56 lbs./ft$^3$, a dry density of 65.5 lbs./ft$^3$ and a pull strength of about 271 pounds measured according to Pull Strength Test Method B.

Example 6

Part A4 is reacted with Part B3 resulting in a foam having a wet density of 62 lbs./ft$^3$, a dry density of 64 lbs./ft$^3$ and a pull strength of about 430 pounds measured according to Pull Strength Test Method B.

Example 7

Part A5 is reacted with Part B1 resulting in a foam having a wet density of 64 lbs./ft$^3$, a dry density of 74 lbs./ft$^3$, and a pull strength of about 419 pounds measured according to Pull Strength Test Method B.

Example 8

A railroad tie in need of repair is provided. A mixture according to Example 2 is applied to a void in the railroad tie. After allowing the mixture to cure, a spike is nailed into at least a portion of the filled area and holds.

The examples provided are not meant to limit the scope of the invention, but rather to provide detail helpful to teach one of ordinary skill in the art how to make and use the present invention. While numerous embodiments and examples have been disclosed herein, it should be apparent that modifications can be made without departing from the spirit and scope of the invention. Therefore, the appended claims are intended to cover all such modifications that are within the scope of this invention. The relevant portions of all documents disclosed herein are hereby incorporated by reference in their entirety. Reference to a document is not to be construed as an admission that such document is prior art. The abbreviations "lbs" means pounds, "ft$^3$" means cubic feet, "mm" is millimeters, "cm" is centimeters, "cps" is centipoises. "ml" is milliliters.

The invention claimed is:

1. A composition comprising at least a part A and a part B;
   the part A comprising at least one polyol;
   the part B comprising at least one isocyanate;
   wherein at least one part further comprises at least one property enhancing agent dispersed therein that is solid at 80° F., wherein said property enhancing agent is selected from the group consisting of gilsonite, glance pitch, grahamite, and mixtures thereof, and wherein the composition exhibits a pull strength of at least about 1000 pounds according to Pull Strength Test Method A.

2. The composition of claim 1 wherein the part A comprises at least one said property enhancing agent.

3. The composition of claim 1 further comprising a member selected from the group consisting of gelling agents, catalysts and mixtures thereof.

4. The composition of claim 1 wherein the softening point of the property enhancer agent is from about 140° F. to about 300° F.

5. The composition of claim 1 further comprising at least one blowing agent, wherein the composition is foamable.

6. The composition of claim 1 wherein one part further comprises a member selected from the group consisting of PVC resins, thermoplastic polyurethane resins, and mixtures thereof.

7. The composition according to claim 1 wherein a difference between wet density and dry density is no greater than about 20 pounds per square foot.

8. A method of repair or reinforcement of a structural member comprising the steps of:
   a) providing a structural member having a void;
   b) providing a mixture of the composition of claim 1; and
   c) applying the mixture to the void creating a filled area.

9. The method according to claim 8 further comprising a step of nailing a spike into at least a portion of the filled area wherein the structural member is a railroad tie and the part A comprises said at least one property enhancing agent.

10. The method of claim 8 wherein the structural member is selected from the group consisting of building materials, window casements, furniture, wells and concrete members.

11. A method of increasing pull strength of a railroad tie comprising the steps of:

a) providing the railroad tie having a void;

b) providing a mixture of the composition of claim 1; and c) applying the mixture to the void creating a filled area.

12. A railroad tie comprising the composition of claim 1.

* * * * *

UNITED STATES PATENT AND TRADEMARK OFFICE
CERTIFICATE OF CORRECTION

| | | |
|---|---|---|
| PATENT NO. | : 7,138,437 B2 | Page 1 of 1 |
| APPLICATION NO. | : 10/379625 | |
| DATED | : November 18, 2006 | |
| INVENTOR(S) | : Giorgini et al. | |

It is certified that error appears in the above-identified patent and that said Letters Patent is hereby corrected as shown below:

On the title page (75), change "A" to --M--.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,138,437 B2 | Page 1 of 1 |
| APPLICATION NO. | : 10/379625 | |
| DATED | : November 21, 2006 | |
| INVENTOR(S) | : Giorgini et al. | |

It is certified that error appears in the above-identified patent and that said Letters Patent is hereby corrected as shown below:

On the title page (75), change "A" to --M--.

This certificate supersedes Certificate of Correction issued May 22, 2007.

Signed and Sealed this

Twelfth Day of June, 2007

JON W. DUDAS
*Director of the United States Patent and Trademark Office*